US012803872B2

(12) United States Patent
Veryanskiy

(10) Patent No.: US 12,803,872 B2
(45) Date of Patent: Nov. 17, 2026

(54) ADAPTABLE DATA CENTER ENVIRONMENT

(71) Applicant: Dropbox, Inc., San Francisco, CA (US)

(72) Inventor: Miron Veryanskiy, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/931,648

(22) Filed: Oct. 30, 2024

(65) Prior Publication Data

US 2026/0121921 A1 Apr. 30, 2026

(51) Int. Cl.
*H04L 41/0816* (2022.01)
*H04L 67/1001* (2022.01)

(52) U.S. Cl.
CPC ...... *H04L 41/0816* (2013.01); *H04L 67/1001* (2022.05)

(58) Field of Classification Search
CPC ........................ H04L 41/0816; H04L 67/1001
See application file for complete search history.

(56) References Cited

U.S. PATENT DOCUMENTS 5,687,369 A 11/1997 Li
9,405,592 B2 8/2016 Sahu
9,572,080 B1 2/2017 Wang et al.
9,796,529 B1 10/2017 Hoareau et al.
10,171,316 B2 1/2019 Hockett et al.
10,230,594 B2 3/2019 Hockett et al.
10,310,912 B2 6/2019 Mankovskii et al.
10,341,253 B2 * 7/2019 Monda .................... H04L 47/76
11,669,386 B1 * 6/2023 Abrol .................. G06F 11/1076 714/15
11,838,182 B2 * 12/2023 Lochhead ........... H04L 63/0853
12,001,312 B1 * 6/2024 Sawal ................... G06F 9/5027
2014/0108000 A1 * 4/2014 Datla ...................... H04L 41/12 703/21
2016/0112904 A1 * 4/2016 Frydman ............... H04L 1/1874 370/229
2019/0064806 A1 2/2019 Nix et al.
2019/0176338 A1 6/2019 Zito et al.
2022/0321501 A1 * 10/2022 Lochhead ............... H04L 49/25
2022/0321503 A1 * 10/2022 Lochhead ........... H04L 41/0806
2022/0354026 A1 * 11/2022 Kelley ............... H05K 7/20818
2023/0061162 A1 * 3/2023 Goska .................. G05B 13/027
2024/0037229 A1 * 2/2024 Pabón ................. G06F 9/45558
2026/0017110 A1 * 1/2026 Nair ....................... G06F 9/5038
2026/0024623 A1 * 1/2026 Rudoff ................. B01J 19/0046

FOREIGN PATENT DOCUMENTS

EP 1324911 B1 9/2011

* cited by examiner

*Primary Examiner* — Michael Won
(74) *Attorney, Agent, or Firm* — Keller Preece PLLC

(57) ABSTRACT

Systems or methods for mobile data processing racks and modular servers to be dynamically reconfigured to optimize performance and efficiency within a data center. Mobile data processing racks help with reducing latency and network utilization by positioning servers in close physical proximity to each other. Modular server reconfiguration accommodates server requirements by adding or removing components as needed. Some servers on these racks may require additional port interface changes or component upgrades to meet specific server configurations. A reconfiguring automated unit or a gantry can receive instructions to reconfigure the modular server into a specific configuration, causing one of the components to be plugged in to meet the desired specification.

20 Claims, 5 Drawing Sheets

ADAPTABLE DATA CENTER ENVIRONMENT

BACKGROUND

The efficient management of workloads within data centers has long been a challenge for IT professionals. Historically, data center operations have relied on rigid, pre-allocated resource pools, where servers were assigned to specific workloads based on static criteria such as processor type, memory capacity, and storage requirements. This approach often led to underutilization of resources, as workloads would be forced to conform to the constraints of the allocated hardware, rather than vice versa. However, even with the advent of cloud-based infrastructure, workload management remains complex. Furthermore, distance in deployments can affect workload efficiency. Aside from just the latency of a single request, moving the data across the network may create a large load on the network. The ever-changing landscape of data center workloads, which can range from traditional batch processing to real-time analytics and machine learning workloads, has only added to the complexity of this challenge.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
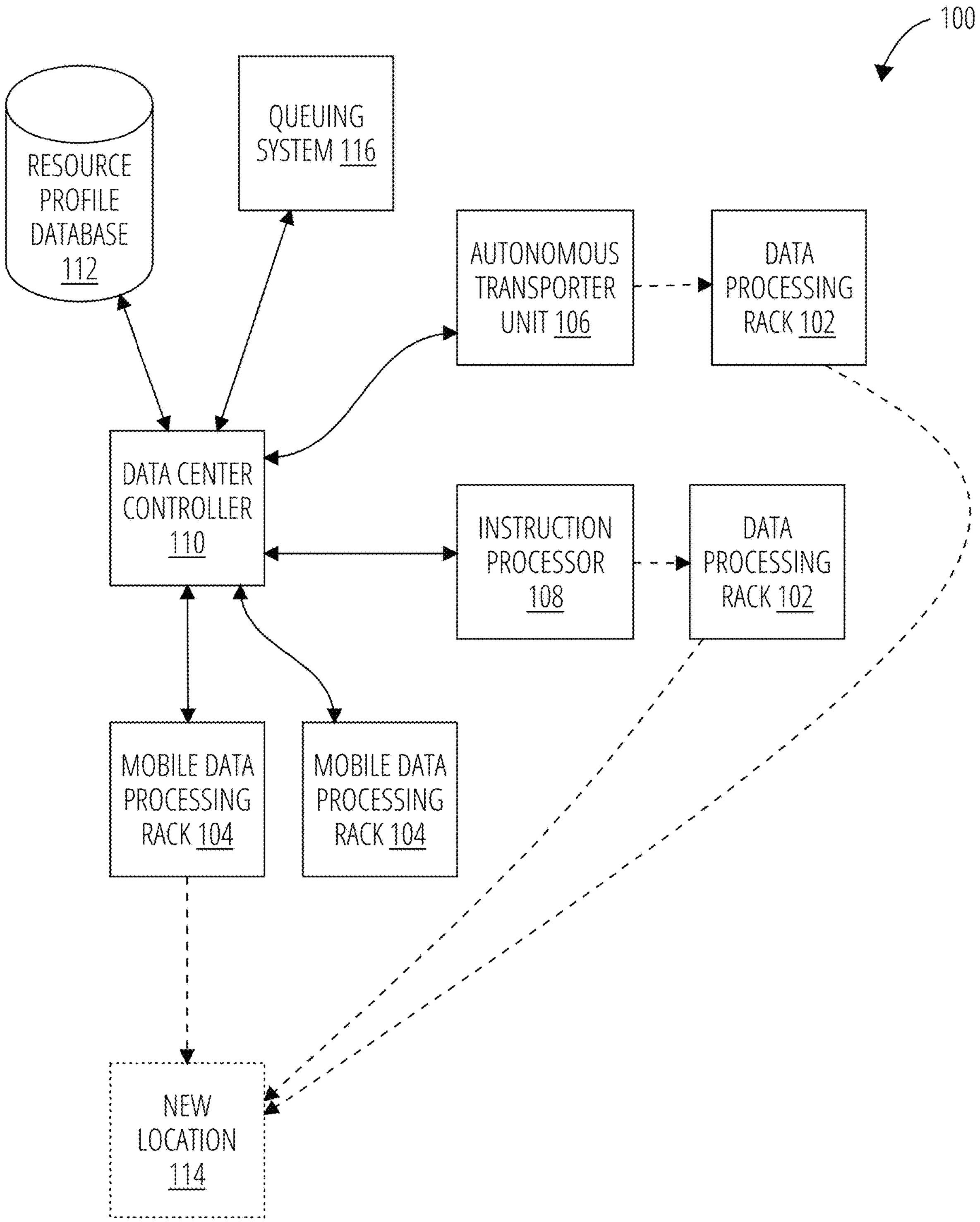
FIG. 1 illustrates an example environment including mobile data processing racks and data processing racks that can be moved using another mobile component in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The present technology provides systems and methods for mobile data processing racks and modular servers to be dynamically reconfigured to optimize performance and efficiency within a data center. For example, some tasks, like machine learning workloads, are limited by data transfer speeds more than by available GPU processing. These tasks could be handled significantly faster if the GPUs were located closer to the data they needed to process.

Accordingly, mobile data processing racks can help with reducing latency and network utilization by positioning servers in close physical proximity to each other. This is particularly beneficial for data processing workloads that require rapid access to large amounts of data, such as machine learning workloads. By mounting racks on mobile bases, they can be moved closer to the data they need to process, reducing network load and latency, and in some cases improving data transfer speeds. For example, in a scenario where a high-performance computing cluster needs to process vast amounts of data from storage systems, mobile data processing racks can be positioned closer to the storage units to optimize performance.

Modular server reconfiguration is another feature of this technology. Some servers on these racks may require additional port interface changes or component upgrades to meet specific server configurations. Modular server components can be reconfigured to accommodate these requirements by adding or removing components as needed. A reconfiguring automated unit or a gantry can receive navigation instructions to reconfigure a modular server into a specific configuration, causing one of the unconnected components to be plugged in to meet the desired specification.

The present technology offers several technical improvements, including reduced latency and network utilization, and increased data transfer speeds by positioning servers closer to each other. The present technology improves performance for data processing workloads that require rapid access to large amounts of data. Dynamic reconfiguration of modular servers may meet changing service requirements and increase flexibility in server configuration and deployment within a data center. For instance, if an application's processing needs increase suddenly, the mobile data processing racks and modular servers can be reconfigured on-the-fly to provide additional processing power. This flexibility is particularly valuable in environments where workloads are subject to rapid changes or unpredictable spikes. The benefits of this technology extend beyond improved performance and efficiency. By reducing latency and network utilization, data centers can also minimize energy consumption and reduce their carbon footprint. Furthermore, the ability to dynamically reconfigure servers and racks reduces the need for manual intervention, minimizing downtime and improving overall reliability.

The technology can be applied in various scenarios, such as redistributing heat among racks to maintain optimal temperatures, reconfiguring servers for additional processing needs or port interface changes, and moving racks closer to data storage locations to reduce network load and latency. This technology also may have far-reaching implications for various industries that rely on data processing and analytics. For example, in finance, mobile data processing racks and modular servers can help optimize trading platforms and provide real-time market analysis. In healthcare, this technology can enable faster and more accurate medical image processing and diagnostic analysis.

By leveraging mobile data processing racks and modular server reconfiguration, the present technology enables more efficient and effective use of resources within a data center. The present technology addresses the need in the art for mobile data processing racks and modular servers to be dynamically reconfigured to optimize performance and efficiency within a data center. This innovative approach enables data centers to adapt quickly to changing service requirements, reduce latency and network utilization, and improve overall performance.

The present technology thus addresses current problems in the art by making it easier to optimize server placement and configuration within a data center. In this way, the present technology reduces each of the multiple action steps required for traditional server deployment, which requires fewer burdens on both a computing system (by minimizing energy consumption and heat buildup) and a user (by reducing the number of steps they need to perform). The present technology also addresses current problems in the art by providing a mobile data processing rack system that can be easily reconfigured to meet changing service requirements. Therefore, by providing dynamic reconfiguration capabilities, the present technology enables data centers to respond rapidly to shifting workloads, reduce latency and network utilization, and improve overall performance. As such, there is a need in the art to appropriately match workloads with the most suitable resources to maximize efficiency, reduce waste, and improve overall data center performance.

FIG. 1 illustrates an example environment 100, including mobile data processing racks and data processing racks that can be moved using another mobile component in accordance with some aspects of the present technology. The bidirectional arrows indicate that the elements are interfacing, whereas the broken arrows indicate that the element is being moved or causing another element to move in a physical space.

The example environment 100 includes data processing racks 102, which may include mobile data processing racks 104. Data processing racks 102 may include conventional data processing racks 102 that are compact, high-density computing platforms comprising multiple processing modules, storage devices, and input/output interfaces. Data processing racks 102 can be housed within a data center or another computational environment, and provide a scalable and flexible infrastructure for hosting various workloads, applications, and services.

Data processing racks 102 may include mobile data processing racks 104. Mobile data processing racks 104 may be designed to be highly portable and adaptable, enabling them to be easily relocated within a data center or other computational environment in response to changing workload demands. Mobile data processing racks 104 may be equipped with navigation and communication systems that allow them to receive navigation instructions from the data center controller 110 regarding their optimized placement within the facility. Upon receipt of these navigation instructions, the mobile data processing rack 104 may autonomously navigate to a new location 114.

In some cases, the mobile data processing rack 104 may be equipped with advanced mobility features that enable it to move itself or be moved by a minimal amount of manual effort. A built-in transporter unit, such as a set of robotic wheels, casters, or even a compact track system, can allow the mobile data processing rack 104 to efficiently navigate through tight spaces and reposition itself within a facility with ease. This self-mobile capability can be further enhanced by incorporating advanced navigation and control systems, including GPS, sensors, and communication protocols that enable the rack to optimize its movement and avoid obstacles. The mobile data processing rack 104 may also include features such as levitation, magnetic levitation, or even active suspension to ensure smooth and vibration-free travel, making it ideal for applications where precise control is crucial.

In addition to built-in mobility capabilities, the mobile data processing rack 104 may also be manually transported by personnel using dollies, hand trucks, or other machinery, such as a pallet jack or forklift. Alternatively, in situations where the rack is too heavy or cumbersome for manual handling, it can be moved across different levels of a building, such as from a basement to an upper floor, using elevators or stairs, and assisted by lifting equipment like cranes if necessary.

In some scenarios, for data processing racks 102 that are not equipped with advanced mobility features, external systems may also be employed, such as an automated transporter unit 106 or an instruction processor 108. In some cases, the automated transporter unit 106 may be in charge of moving a number of data processing racks 102. The automated transporter unit 106 may include a tracked platform, an autonomous guide system, an autonomous chassis system, or a route navigation system in the data center. In some cases, the automated transporter unit 106 includes a gantry or robotic arm that picks up the mobile data processing rack and drops the mobile data processing rack at the new location 114.

In some cases, the automated transporter unit 106 may be automated by a computer system that controls its movements and operations, such as a programmable logic controller. Alternatively, the automated transporter unit 106 may be autonomous in that it can operate independently without human intervention, using sensors, cameras, and other advanced technologies to navigate the data center and perform tasks on its own. The automated transporter unit 106 may also be semi-autonomous, requiring some human input or oversight while still performing tasks automatically. Furthermore, the automated transporter unit 106 may utilize machine learning algorithms to optimize its routes and operations, or it may employ artificial intelligence (AI) techniques to anticipate and respond to changing conditions within the data center. Additionally, in some cases, the automated transporter unit 106 may be integrated with other systems and devices within the data center to enable more efficient and effective data processing operations. In some cases, an instruction processor 108 may receive the navigation instructions and process the navigation instructions for movement of the data processing rack 102 to the new location 114. For example, the instruction processor 108 may display the navigation instructions or a visual map for an IT personnel to assist with the movement of data processing rack 102. The mobility and adaptability of the data processing racks 102 optimize the data center for system performance, reduce latency, and improve overall IT infrastructure efficiency.

The example environment may also include a data center controller 110. The data center controller 110 may be a computational system designed to manage and optimize resource utilization within a data center. The data center controller 110 may function as a central hub, collecting and analyzing real-time data from various sources, including the data processing racks 102, the servers on the data processing racks 102, the automated transporter units 106, and the instruction processor 108. The analysis enables the data center controller 110 to determine the most efficient way to reconfigure or relocate these components to improve key metrics such as workload distribution, energy consumption, and overall system performance. Leveraging sophisticated algorithms and predictive modeling, the data center controller 110 can anticipate future changes in demand, adjust configurations accordingly, and even predict potential bottlenecks before they occur.

The data center controller 110 may interface with a resource profile database 112. The resource profile database 112 may store and manage resource profiles for the data processing racks 102, which may include, the mobile data processing racks 104. The resource profile database 112 may serve as a repository of information that describes the capabilities, characteristics, and configurations of each data processing rack 102.

In more detail, the resource profile database may house a vast array of information about each mobile data processing rack, including but not limited to its computational power, memory capacity, storage space, network connectivity, I/O interface specifications, and thermal distribution profiles. This rich set of metadata enables the data center controller 110 to make informed decisions when orchestrating the movement of the data processing racks 102 and the mobile data processing racks 104 within a data center.

For instance, when the data center controller 110 needs to determine which data processing rack 102 should be moved to a new location to balance workload distribution, it can query the resource profile database 112 for relevant information about available data processing racks 102. This might involve retrieving details such as the rack's current utilization levels and performance metrics, its available resources (e.g., CPU, memory, storage), and any constraints or limitations on its movement (e.g., due to thermal concerns or pending maintenance). By accessing the granular data from the resource profile database 112, the data center controller 110 can make a more accurate assessment of which data processing rack 102 is best suited for reassignment and thus optimize overall data center performance.

Additionally, the data center controller 110 may be relocating data processing closer to server locations, thereby reducing network latency and can increase data transfer speeds. This approach leverages high-speed interfaces with shorter distance limitations, enabling workloads to be processed within racks without transferring data over traditional network topologies. By processing workloads locally within racks, organizations can also reduce the strain on their network infrastructure and minimize the risk of congestion and outages. Furthermore, with data processing happening closer to the source, the data center controller 110 may be able to implement more granular security policies and controls, improving overall system resilience and compliance posture. As a result, this approach enables businesses to create more agile, high-performance, and secure computing environments that are better equipped to meet the demands of modern applications and workloads.

In some cases, when tracking the inventory and accessing service data, the data center controller 110 may create a wait time determined by a queuing system 116. The queuing system 116 may create a workload priority queue based on the accessed data of the services and availability from the inventory. As such, based on input from the queuing system 116, an instruction may include moving a data processing rack 102 to a second new location based on the workload priority queue.

Figure 2:
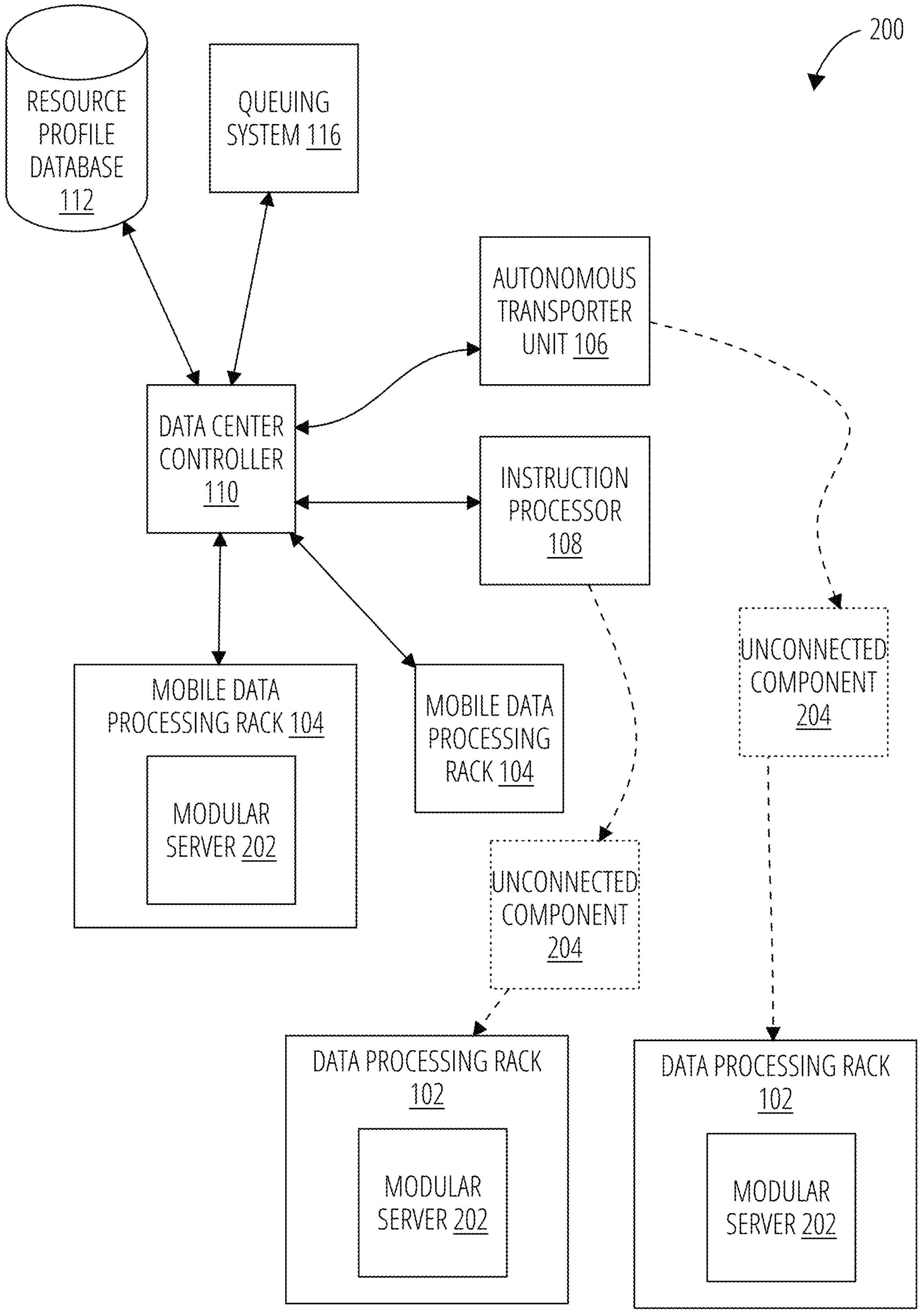
FIG. 2 illustrates an example environment including a mobile data processing rack and a data processing rack with modular servers in accordance with some aspects of the present technology.

FIG. 2 illustrates an example environment 200 including a mobile data processing rack and a data processing rack with modular servers in accordance with some aspects of the present technology. The bidirectional arrows indicate that the elements are interfacing, whereas the broken arrows indicate that the element is being moved or causing another element to move in a physical space.

In some cases, the data processing racks 102 may reconfigurable data processing racks that are equipped with modular servers 202 that facilitate efficient upgrading, maintenance, and reconfiguration. The modular servers 202 may comprise individual processing units, storage devices, or networking interfaces that are designed to be easily added or removed from the data processing racks 102. The modular servers 202 may be connected to a mainframe of the data processing rack 102 using connectors, such as standardized connectors. Modular servers 202 may enable IT personnel, an automated transporter unit 106, or a feature of the data processing rack 102 itself to swap out faulty components, upgrade processing resources, or reconfigure the modular servers 202 without having to replace the entire data processing rack 102.

As shown in FIG. 2, the data center controller 110 may control the automated transporter unit 106 to move an unconnected component 204 to a data processing rack 102 with a modular server 202. The data center controller 110 may control the instruction processor 108 to move the unconnected component 204 to the data processing rack 102 with the modular server 202. In some cases, the data center controller 110 may also control mobile data processing racks 104, which may carry modular servers 202, to move them closer to unconnected components 204.

In some cases, the unconnected components 204 can be stored on in a holding location, such as above the data processing rack 102, awaiting deployment as needed. The instruction processor 108 or the automated transporter unit 106 may receive navigation instructions from the data center controller 110 to move specific components, such as processing units, storage devices, or networking interfaces, from the holding location to the modular server slots within the data processing rack 102.

In some cases, the data center controller 110 tracks an inventory of connected components and unconnected components of a plurality of modular servers 202 in the data center. The data center controller 110 may also access data associated with services that are being performed at respective servers on a plurality of data processing racks in the data center. The accessed data may include workload performance and resource utilization associated with the respective services. The accessed data may be stored in the resource profile database 112. The data center controller 110 may also receive self-reports from the plurality of data processing racks regarding the connected components.

Furthermore, data associated with services performed at a plurality of data processing racks in the data center may be accessed. The data may include workload performance and resource utilization associated with the respective services. In some cases, a service associated with improving data center metrics may need additional resources. As used herein, "data center metrics" may include individual rack metrics, individual server metrics, data center-level metrics (such as overall power consumption) and/or any other metrics associated with the data center or any equipment within the data center. In some cases, when tracking the inventory and accessing service data, the data center controller 110 may create a wait time determined by a queuing system 116. The queuing system 116 may create a workload priority queue based on the accessed data of the services and availability from the inventory. As such, based on input from the queuing system 116, an instruction may include moving a component plugged into a first server to a next server based on the workload priority queue.

In some cases, the navigation instructions sent by the data center controller 110 may include instructing a gantry to retrieve a component (connected or unconnected), and then instructing the gantry to insert the component into an interface, such as a front-facing Peripheral Component Interconnect (PCI) interface of the server. In some cases, the unconnected component is an input/output (I/O) interface, a power supply unit (PSU), or a processing unit. The interface may also be rear-facing, and the servers may have components accessible at both sides. In some cases, a single node may be dual-serviced such that two mobile gantries can reconfigure servers simultaneously from the front side and the rear side. Additionally, reconfiguring PSUs may be serve as a way to optimize Power Usage Effectiveness (PUE) dynamically. PSUs are frequently modular, and PSU swaps can provide an increase in power budget of the servers depending on the workload, or a decrease in the power budget for a server to allow it to run at a more efficient load factor of a power supply. For example, for a small power supply, overloading past its rating, can risk fire events. On the other hand, for a big power supply, it is not advised to load it up to 90-100%, risking consuming power less efficiently per Watt of delivered power.

In some cases, the retrieved component may be an unconnected component already harvested from a server, such as a modular server. In some cases, a designated transporter unit or the automated transporter unit 106 may harvest connected components. In some cases, the connected components may be dormant, or, when for example there is amble redundancy, some in-use components may be depopulated and harvested as well. Component collection can be implemented through a centralized aggregator and sorter, where servers can have a mechanism to self-discard components into a collection funnel, or a "reaper" device can move around to extract components. Discarded or harvested components can then fall or be deposited into a component sorting mechanism that inventories them into organized consumable caches of components for use by a component distributor or distribution mechanism.

In some cases, component distribution may be implemented by leveraging the organized inventoried cache of components as a centralized source of available components. A component distributor may take a component from the centralized inventory cache and move it closer to where it may need to be used, while a distribution mechanism can be implemented to pick up components from the cache and transport them closer to the servers.

In some cases, the central-cache collection and distribution mechanism may comprise a network of conveyor belts, or possibly a pneumatic tube transport system, or free-flying or free-driving automated units that collect and/or distribute components between the component cache and the point of consumption. The automated units may be designed to move around and collect or drop off components as needed.

In some cases, the data center controller 110 may predict fluctuations in heatmap values across multiple timestamps, considering the workload priority queue and accessed data. The data center controller 110 may also consider thermal distribution readings of the data center to identify an optimal server configuration. Based on this analysis, the data center controller 110 may determine that one or more servers require additional components to balance workload distribution and achieve the preferred configuration.

In some cases, predicting changes in heatmap values across multiple timestamps involves analyzing the workload priority queue, resource profile data, and workload performance data. This comprehensive approach enables the determination of an optimal server configuration, which can involve relocating a mobile data processing rack 104 to a new location to balance workload distribution.

In some cases, individual modular servers themselves may be moved based on navigation instructions from the instruction processor 108 or the automated transporter unit 106, thereby facilitating efficient reconfiguration of the system and optimizing resource utilization. For example, a feature of the modular server 202 may be required in the new location 114 such that faster data processing is closer to certain servers.

For example, in applications requiring intense graphics processing, such as video encoding, scientific simulations, machine-learning applications, AI-inference tasks, or gaming, a graphics processing unit (GPU) module could be added to the server on-demand. This module would contain one or more high-performance GPUs, and could be easily swapped out when the workload changes. For example, a cloud gaming provider might use GPU modules to handle intense graphics processing for multiple users.

For data centers handling massive amounts of network traffic, a high-speed networking module could be used to boost performance. The high-speed networking unit can have multiple very fast connections, which can be added or removed depending on how much network capacity is required. For example, a video encoding service might employ high-speed networking modules and flash storage modules to optimize performance and reduce latency.

In scenarios where fast storage is essential, such as in databases or cloud-based applications, a flash storage module could be integrated into the server. This module could provide ultra-fast storage capabilities, and could be swapped out when storage needs change. In environments where sensitive data is being processed, a security and encryption module could be used to enhance protection. The security and encryption module might contain advanced encryption algorithms, intrusion detection systems, or other security features that can be added or removed as needed. For instance, a database management system might use such flash storage modules and security and encryption modules to ensure fast and secure data access.

For applications requiring advanced audio/video processing, such as video conferencing or media streaming, an A/V processing module could be added to the server. This module might contain specialized hardware for encoding, decoding, or transcoding audio and video streams. As an example, a media streaming platform might utilize audio/video processing modules and high-speed networking modules to deliver high-quality video content to users.

Figure 3:
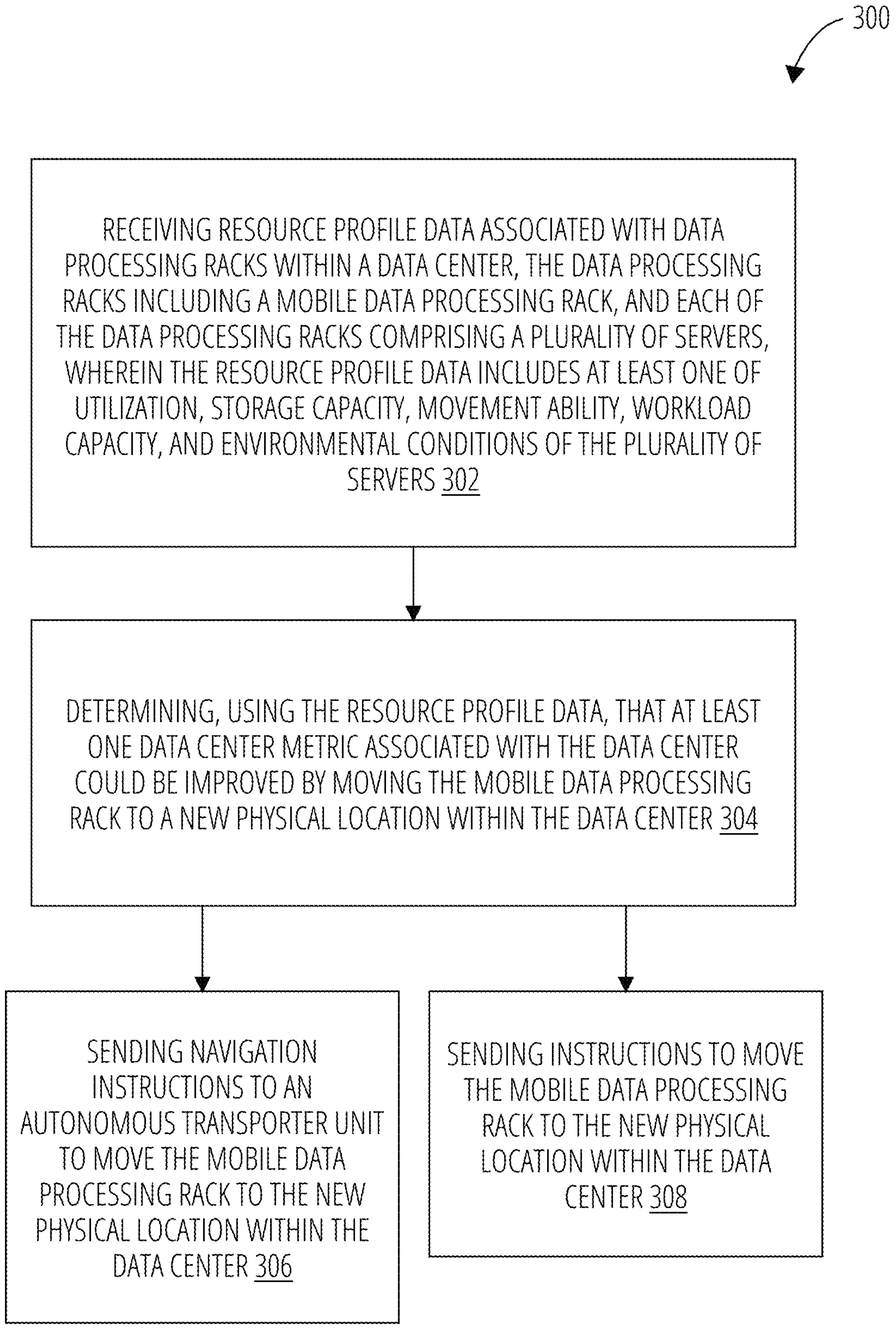
FIG. 3 illustrates an example method for sending navigation instructions to an automated transporter unit to move a mobile data processing rack to the new physical location within the data center in accordance with some aspects of the present technology.

FIG. 3 illustrates an example method 300 for sending navigation instructions to an automated transporter unit to move a mobile data processing rack to the new physical location within the data center in accordance with some aspects of the present technology. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method includes receiving resource profile data associated with data processing racks within a data center at block 302. In some cases, the data center controller 110 receives the resource profile data. The data processing racks may include a mobile data processing rack. The data processing racks may comprise a plurality of servers. The resource profile data may include at least one of utilization, storage capacity, movement ability, workload capacity, and environmental conditions of the plurality of servers.

According to some examples, the method includes determining, using the resource profile data, that at least one data center metric associated with the data center could be improved by moving the mobile data processing rack to a new physical location within the data center at block 304. In some cases, the data center controller 110 may determine that the at least one data center metric associated with the data center could be improved.

According to some examples, the method includes sending navigation instructions to an automated transporter unit to move the mobile data processing rack to the new physical location within the data center at block 306. In some cases, the data center controller 110 may send the navigation instructions. In some cases, the mobile data processing rack includes the automated transporter unit that moves the mobile data processing rack, i.e., without being controlled by the data center controller 110. In some cases, sending the navigation instructions includes remotely controlling the automated transporter unit to move the mobile data processing rack to the new physical location. In some cases, the mobile data processing rack is instructed to dock an optical connector at a particular optical interconnect of a data rack at the new physical location.

In some cases, a first port interface of the mobile data processing rack may be determined to not match a second port interface of a second rack in the new physical location. The mobile data processing rack may include a modular server 202 with reconfigurable components. The data center controller 110 may send navigation instructions to an automated reconfiguration unit 106 to reconfigure the modular server 202 into a revised configuration that includes the second port interface. In some cases, the navigation instructions cause a second automated transporter unit 106 to receive and plug in an unconnected component 204 to meet the revised configuration.

In some cases, workload performance data may be received from a plurality of mobile data processing racks including the previously-mentioned mobile data processing rack. In some cases, the mobile data processing rack is determined to be idle or underutilized based on the workload performance data. As such, the movement of the mobile data processing rack to improve the at least one data center metric may be based on the determination that the mobile data processing rack is idle or underutilized.

In some cases, data associated with services may be accessed. The services may be performed at the data processing racks in the data center. The data associated with the services may include the workload performance data and the resource profile data associated with the respective services. The workload priority queue may be created based on the data associated with the services and availability of the plurality of mobile data processing racks. A next instruction to the automated transporter unit may include moving the mobile data processing rack to a next location based on the workload priority queue.

In some cases, the workload performance data and the resource profile data of the plurality of mobile data processing racks may be received by the data center controller 110. The data center controller 110 may further compare the resource profile data of the mobile data processing rack with resource profile data of other mobile data processing racks of the plurality of mobile data processing racks. In some cases, the data center controller 110 may determine that the resource profile data of the mobile data processing rack is an anomaly compared to the resource profile data of other mobile data processing racks. For example, the data center controller 110 may determine that the resource profile data of the mobile data processing rack is an anomaly based on a determination that the resource profile data of the mobile data processing rack exhibits a significant deviation from an average of the resource profile data of the other mobile data processing racks. When the data center controller 110 determines that the resource profile data of a particular mobile data processing rack exhibits a significant deviation (e.g., deviation above a certain threshold amount or percentage) from the average resource profile data of the other mobile data processing racks, it may trigger a reconfiguration or optimization process to identify and address any potential issues. This could involve automatically rebalancing workloads across the mobile data processing racks, adjusting resource allocation parameters for the affected rack, or even triggering a maintenance window for the rack to perform software updates, hardware upgrades, or other corrective actions.

In some cases, the new physical location may be identified based on a prioritization of one or more racks associated with a service at the new physical location. The prioritization may be set based on a machine-learning method that prioritizes services based on the resource profile data and the workload performance data as inputs. Furthermore, the machine-learning method may be trained on historical workload performance data and historical resource utilization data.

In some cases, an indication may be received, or it may be determined that a set of the plurality of mobile data processing racks are high value components. High value components may refer to racks or servers that contain critical data, applications, or services that are essential to the operation of a business or mission-critical applications. High-value components may also include racks with advanced computing capabilities, such as those used for machine learning, artificial intelligence, or data analytics. The determination of high-value components can be based on various factors, including their importance to business operations, the level of dependency on them, and the potential impact of downtime or data loss.

The data center controller 110 may further determine that one or more of the set of mobile data processing racks are idle or underutilized, perhaps due to a shift in workload or changes in business requirements. As such, the data center controller 110 may load balance the one or more set of mobile data processing racks by sending navigation instructions to move the one or more set of mobile data processing racks to the new physical location or a different one or more locations. This can help optimize resource utilization, reduce costs, and improve overall efficiency in the data center. The data center controller 110 may also consider other factors when making this decision, such as power consumption, cooling requirements, and network connectivity needs of each rack, to ensure that they are placed in a location where their high-value components can be properly supported and maintained.

In some cases, the data center controller 110 may determine that improving the at least one data center metric requires one or more specific server configurations. The data center controller 110 may determine that the mobile data processing rack is missing the one or more specific server configurations. In some cases, the data center controller 110 may send navigation instructions to one or more modular servers with unconnected components to be reconfigured into the one or more specific server configurations. The navigation instructions may cause one or more of the unconnected components to be plugged in to meet the one or more specific server configurations. The data center controller 110 may further send navigation instructions to one or more respective automated transporter units to move the one or more modular servers to the new physical location.

In some cases, a service associated with improving the at least one data center metric may be identified to need additional resources. An inventory of connected components and unconnected components of a plurality of modular servers in a data center may be tracked. The data center controller 110 may further access data associated with services, including the service, performed at a plurality of data processing racks in the data center, wherein the view includes workload performance and resource utilization associated with the respective services, wherein the identifying that the service needs the additional resources is based on the workload performance and resource utilization.

Figure 4:
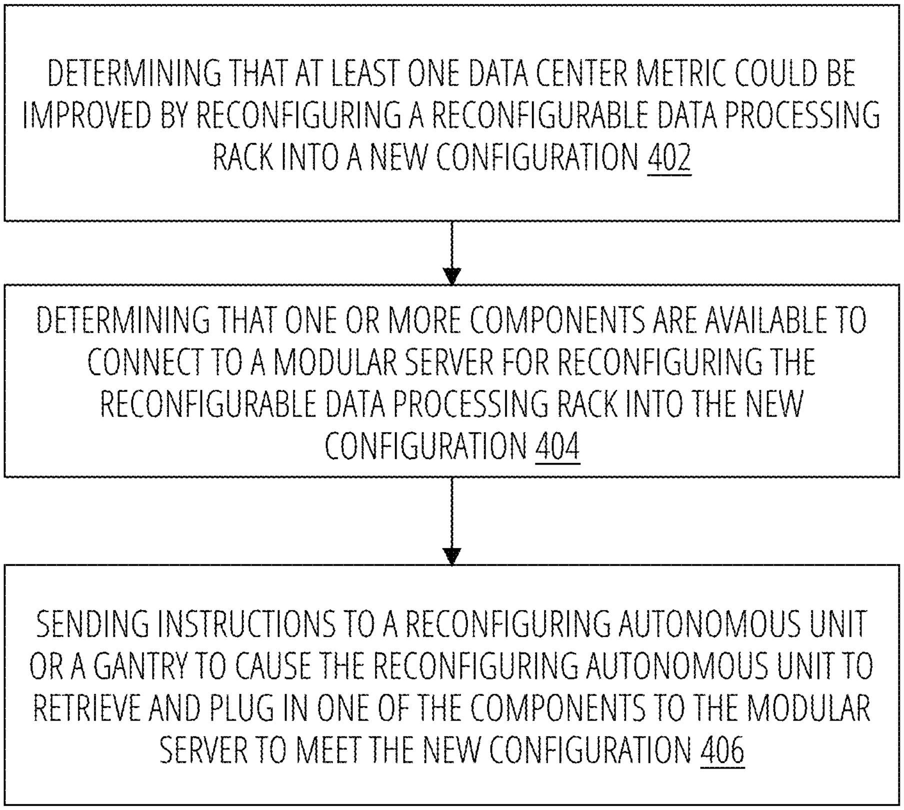
FIG. 4 illustrates an example method for sending navigation instructions to a reconfiguring automated unit or a gantry to reconfigure a modular server into a specific server configuration in accordance with some aspects of the present technology.

FIG. 4 illustrates an example method for sending navigation instructions to a reconfiguring automated unit or a gantry to reconfigure a modular server into a specific server configuration in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

In some cases, the data center controller 110 may identify a preferred server configuration for a server to run a service. The data center controller 110 may then send navigation instructions to the data processing rack 102, the automated transporter unit 106, or the instruction processor 108 to move an unconnected component to a particular server to configure the particular server to have the preferred server configuration. In some cases, the navigation instructions may cause the unconnected component to be plugged into the particular server to have the preferred server configuration.

According to some examples, the method includes determining that at least one data center metric could be improved by reconfiguring a reconfigurable data processing rack into a new configuration at block 402. The data center controller 110 may determine that at least one data center metric could be improved by using a modular server that is closer, thereby reducing latency and improving performance.

In some cases, the method includes determining that one or more unconnected components are available to connect to a modular server for reconfiguring the reconfigurable data processing rack into the new configuration at block 404. In some cases, the modular server may include the one or more unconnected components. The data center controller 110 may determine that unconnected components are available such that the modular server 202 can be configured using the unconnected components. The unconnected components can include any number and type of servers, storage units, networking equipment, power supplies, and other computing resources that can be connected to the modular server to meet the requirements of the new configuration. The determination may be made by analyzing data from various sources, such as inventory management systems, monitoring tools, and predictive models. In some cases, the modular server itself may include one or more unconnected components, which can then be utilized to configure the server. For example, if the modular server includes a blank slot for a storage unit, the method may determine that an available storage unit can be connected to fill this slot.

According to some examples, the method includes sending instructions to a reconfiguring automated unit or a gantry to cause the reconfiguring automated unit to plug in one of the unconnected components to the modular server to meet the new configuration at block 406. The reconfiguring automated unit or gantry can be equipped with robotic arms and other mechanical devices that allow it to physically connect the unconnected component to the modular server. Alternatively, a human operator may manually perform this task. In some cases, the method may also include testing the new configuration to ensure that all components are functioning properly and that there are no conflicts or issues. This can be done through automated testing tools or manual verification by a system administrator. The new configuration can then be verified as complete and functional, allowing it to be utilized in production environments without any interruptions or downtime.

In some cases, the data center controller 110 may access data associated with services performed at the data processing racks in the data center. The data associated with the services may include the workload performance data and the resource profile data associated with the respective services. The data center controller 110 may further identify that one of the services associated with improving the at least one data center metric needs additional resources. The identification that the service needs additional resources may be based on the workload performance and resource utilization. In some cases, the data center controller 110 may further track an inventory of connected components and unconnected components of a plurality of modular servers in a data center. The data center controller 110 may determine that the additional resources are available based on an available modular server and available unconnected component. In some cases, instructions may be sent to an automated transporter unit or a gantry to bring the modular server and available unconnected component and/or combine the two to create the needed additional resources.

In some cases, the data center controller 110 may create a workload priority queue based on the data associated with the services and availability from the inventory. An instruction to the automated transporter unit may include moving the mobile data processing rack to a next location based on the workload priority queue.

In some cases, a gantry may be instructed to retrieve the unconnected component. In some cases, the data center controller 110 may instruct the gantry to insert the unconnected component into a front-facing Peripheral Component Interconnect (PCI) interface of the server. In some cases, the unconnected component may be an input/output (I/O) interface, a power interface, or a processing unit.

For example, the data center controller 110 may identify that a first modular server 202 needs a high-performance graphics card to run a graphics-intensive application. The data center controller 110 may send instructions to an instruction processor 108 or a reconfiguring automated unit to move a compatible graphics card from storage (or another modular server) to the first modular server 202, where it is plugged in to configure the first modular server 202 for the specific service.

In some cases, to optimize performance for a database service, the data center controller 110 may determine that a second modular server 202 requires an additional solid-state drive (SSD). The data center controller 110 may instruct the instruction processor 108 or the reconfiguring automated unit to allocate the SSD to the second modular server 202 and plugs it in, thereby configuring the second modular server 202 with the preferred configuration for the database service.

As another example, for a web services application, the data center controller 110 may identify that a third modular server 202 needs a specific load balancer card. The instruction processor 108 or the reconfiguring automated unit may be directed to move the load balancer card from storage (or another modular server) to the third modular server 202, where it is securely connected to configure the third modular server 202 for efficient handling of incoming requests.

These examples illustrate how the data center controller 110 can dynamically adjust server configurations based on changing service requirements, thereby optimizing performance and efficiency within the data center.

Figure 5:
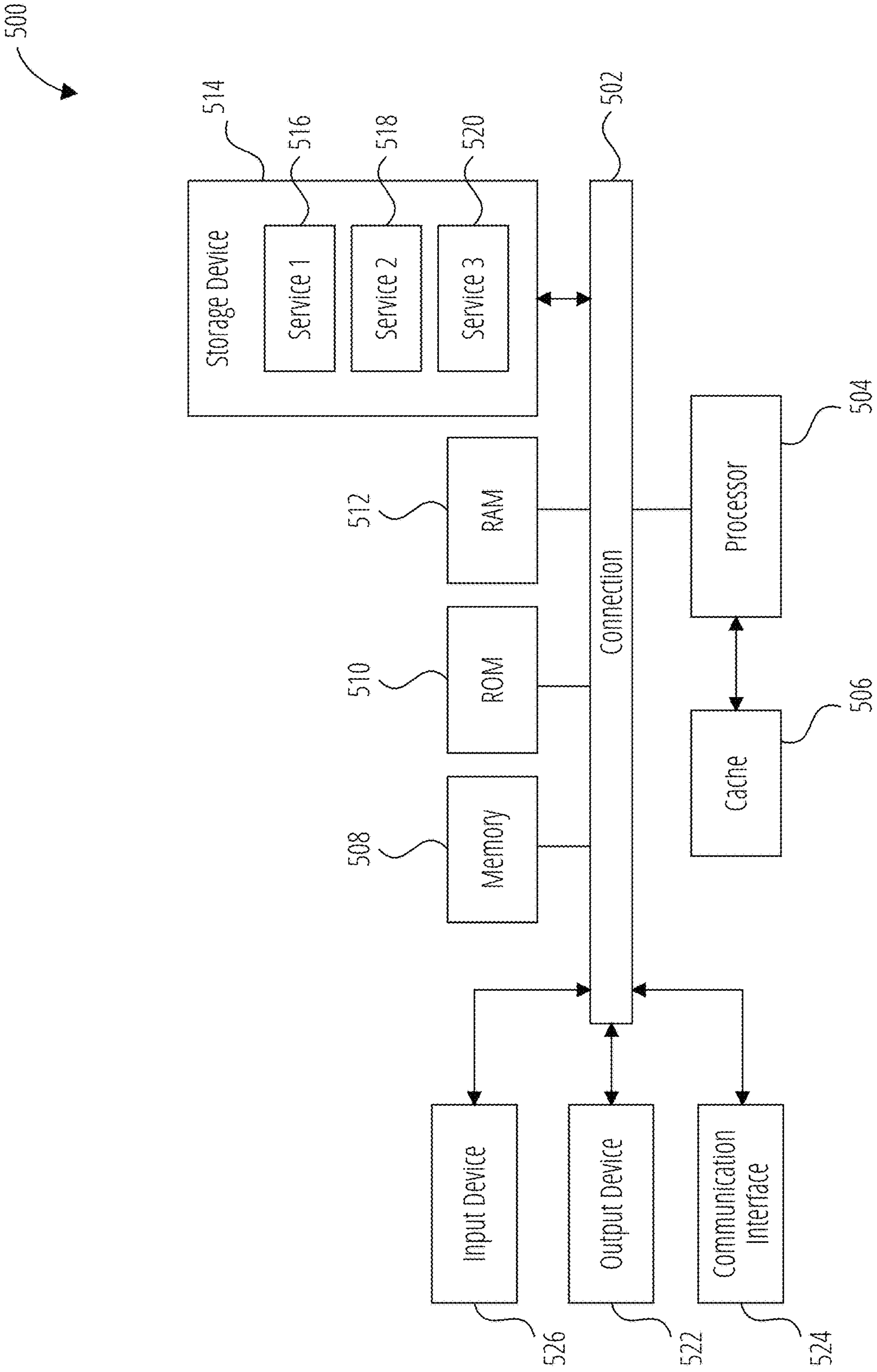
FIG. 5 shows an example of computing system, in accordance with some aspects of the present technology.

FIG. 5 shows an example of computing system 500, which can be for example any computing device making up the data processing rack 102, mobile data processing rack 104 automated transporter unit 106, instruction processor 108, data center controller 110, resource profile database 112, or queuing system 116, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 5088, such as read-only memory (ROM) 510 and random access memory (RAM) 512 to processor 504. Computing system 500 can include a cache of high-speed memory 508 connected directly with, in close proximity to, or integrated as part of processor 504.

Processor 504 can include any general purpose processor and a hardware service or software service, such as services 506, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method comprising:

receiving resource profile data associated with data processing racks within a data center, the data processing racks including a mobile data processing rack, and each of the data processing racks comprising a plurality of servers, wherein the resource profile data includes at least one of utilization, storage capacity, movement ability, workload capacity, or environmental conditions of the plurality of servers;

creating a workload priority queue based on data associated with services performed at the data processing racks, the data associated with the services including the resource profile data;

determining, using the resource profile data, that at least one data center metric associated with the data center could be improved by moving the mobile data processing rack to a new physical location within the data center; and sending navigation instructions to an automated transporter unit to move the mobile data processing rack to the new physical location within the data center according to the workload priority queue.

2. The computer-implemented method of claim 1, further comprising:

determining a mismatch between the mobile data processing rack and a second rack, wherein the mobile data processing rack includes a modular server with reconfigurable components; and sending instructions to an automated reconfiguration unit to reconfigure the modular server into a revised configuration.

3. The computer-implemented method of claim 2, wherein the mismatch is between a first port interface of the mobile data processing rack that does not match a second port interface of the second rack in the new physical location, and wherein the navigation instructions cause a second automated transporter unit to plug in an unconnected component to meet the revised configuration that includes the second port interface.

4. The computer-implemented method of claim 1, further comprising:

receiving workload performance data from a plurality of mobile data processing racks including the mobile data processing rack; and determining the mobile data processing rack is idle or underutilized based on the workload performance data.

5. The computer-implemented method of claim 4, further comprising:

accessing the data associated with the services performed at the data processing racks in the data center, wherein the data associated with the services includes the workload performance data and the resource profile data associated with the services; and creating the workload priority queue based on the data associated with the services and availability of the plurality of mobile data processing racks, wherein a next instruction to the automated transporter unit includes moving the mobile data processing rack to a next location based on the workload priority queue.

6. The computer-implemented method of claim 4, further comprising:

predicting changes in heatmap values in the data center across multiple timestamps the resource profile data and the workload performance data; and determining that another mobile data processing rack should be moved to a second location to balance workload distribution.

7. The computer-implemented method of claim 4, further comprising:

monitoring the workload performance data and the resource profile data of the plurality of mobile data processing racks;

comparing the resource profile data of the mobile data processing rack with resource profile data of other mobile data processing racks of the plurality of mobile data processing racks; and determining the resource profile data of the mobile data processing rack is an anomaly compared to the resource profile data of the other mobile data processing racks.

8. The computer-implemented method of claim 4, wherein the new physical location is identified based on a prioritization of one or more racks associated with a service at the new physical location, wherein the prioritization is set based on a machine-learning model trained on historical workload performance data and historical resource utilization data.

9. The computer-implemented method of claim 1, wherein the mobile data processing rack includes the automated transporter unit that moves the mobile data processing rack autonomously.

10. The computer-implemented method of claim 1, wherein sending the navigation instructions includes remotely controlling the automated transporter unit to move the mobile data processing rack to the new physical location.

11. The computer-implemented method of claim 1, further comprising:

instructing the mobile data processing rack to dock an optical connector at a particular optical interconnect of a data rack at the new physical location.

12. The computer-implemented method of claim 4, further comprising:

receiving an indication or determining that a set of the plurality of mobile data processing racks are high value components;

determining that one or more mobile data processing racks of the set of the plurality of mobile data processing racks are idle or underutilized; and load balancing the set of the plurality of mobile data processing racks by sending navigation instructions to move the one or more mobile data processing racks to the new physical location or a different one or more locations.

13. The computer-implemented method of claim 4, further comprising:

determining that improving the at least one data center metric requires one or more specific server configurations;

determining that the mobile data processing rack is missing the one or more specific server configurations;

sending instructions to one or more modular servers with unconnected components to reconfigured into the one or more specific server configurations, wherein the instructions cause one or more of the unconnected components to be plugged in to meet the one or more specific server configurations; and sending navigation instructions to one or more respective automated transporter units to move the one or more modular servers to the new physical location.

14. A system comprising:

one or more processors; and memory storing instructions that, when executed by the one or more processors, cause the system to:

receive resource profile data associated with data processing racks within a data center, the data processing racks including a mobile data processing rack, and each of the data processing racks comprising a plurality of servers, wherein the resource profile data includes at least one of utilization, storage capacity, movement ability, workload capacity, or environmental conditions of the plurality of servers;

create a workload priority queue based on data associated with services performed at the data processing racks, the data associated with the services including the resource profile data;

determine, using the resource profile data, that at least one data center metric associated with the data center could be improved by moving the mobile data processing rack to a new physical location within the data center; and send instructions to move the mobile data processing rack to the new physical location within the data center according to the workload priority queue.

15. The system of claim 14, wherein the instructions, when executed by the one or more processors, further cause the system to:

access the data associated with the services performed at the data processing racks in the data center, wherein the data associated with the services includes workload performance data and the resource profile data associated with the services;

identify that one of the services associated with improving the at least one data center metric needs additional resources, wherein identifying that the service needs the additional resources is based on the workload performance data and resource utilization;

track an inventory of connected components and unconnected components of a plurality of modular servers in a data center; and determine that the additional resources are available based on an available modular server and available unconnected component.

16. The system of claim 15, wherein the instructions, when executed by the one or more processors, further cause the system to:

create the workload priority queue based on the data associated with the services and availability from the inventory, wherein a next instruction to an automated transporter unit includes moving the mobile data processing rack to a next location based on the workload priority queue.

17. A non-transitory computer-readable storage medium, the computer-readable storage medium including instructions that when executed by a one or more processors of a system, cause the system to:

determine that at least one data center metric could be improved by reconfiguring a reconfigurable data processing rack into a new configuration;

create a workload priority queue based on data associated with services performed at a plurality of data processing racks;

determine that one or more components are available to connect to a modular server for reconfiguring the reconfigurable data processing rack into the new configuration; and send reconfiguration instructions to a reconfiguring automated unit or a gantry to cause the reconfiguring automated unit or the gantry to retrieve and plug in a component of the one or more components to the modular server to meet the new configuration according to the workload priority queue.

18. The non-transitory computer-readable storage medium of claim 17, wherein the instructions cause the system to:

instruct the reconfiguring automated unit or the gantry to retrieve the component; and instruct the reconfiguring automated unit or the gantry to insert the component into an interface of the modular server.

19. The non-transitory computer-readable storage medium of claim 17, wherein the component is an input/output (I/O) interface, a power supply unit, or a processing unit.

20. The non-transitory computer-readable storage medium of claim 17, wherein the system further creates the workload priority queue based on the data associated with the services performed at the plurality of data processing racks and workload performance data from a plurality of reconfigurable data processing racks comprising the reconfigurable data processing rack, wherein a next instruction to an automated transporter unit includes moving the component to a next server based on the workload priority queue.

* * * * *